June 19, 1962

J. B. JAMES 3,040,303

DATA STORAGE APPARATUS

Filed Feb. 26, 1959

2 Sheets-Sheet 1

June 19, 1962 J. B. JAMES 3,040,303

DATA STORAGE APPARATUS

Filed Feb. 26, 1959

2 Sheets-Sheet 2

3,040,303

DATA STORAGE APPARATUS

John Bernard James, Stevenage, England, assignor to International Computers and Tabulators Limited, London, England Filed Feb. 26, 1959, Ser. No. 795,682
Claims priority, application Great Britain Mar. 3, 1958
10 Claims. (Cl. 340—174)

The present invention relates to data storage apparatus and in particular to data storage apparatus of the kind including a matrix of storage elements arranged to form matrix rows and columns, each storage element having two stable states between which it can be switched. The storage elements may for example be bi-stable trigger circuits employing thermionic or cold cathode valves or transistors, or ferromagnetic or ferroelectric elements, the two stable states in the latter two cases being conditions of magnetic or electric saturation in opposite directions in an element. As the elements have only two stable states data will usually be stored in the apparatus in binary form, an element in one of the two states representing a binary "one" and in the other a binary "zero." Data-representing signals in other forms will then have to be converted to binary form before they can be stored in the apparatus.

Further, data storage apparatus of the kind specified can be arranged to have parallel input and output circuits, that is to say input circuits in which all the digits of a binary data-representing signal are fed into the storage apparatus simultaneously on separate lines, whilst, when any item of data is read out from the storage apparatus, the digits appear simultaneously on separate output lines.

Where storage apparatus of the kind specified is arranged for parallel operation and is employed, for example as a buffer or an immediate access store in an electronic digital computer, the requirement often arises that it should be possible to read out information stored at a rapid rate. If the read-out operation is destructive, that is to say if it involves returning all the storage elements from which data is read out to a given one of their two stable states, and it is required to retain the information in the store after reading out, it is necessary to re-insert the signals read out into the part of the storage apparatus from which they were derived. Various proposals for effecting this re-insertion have been made, but in each case the re-insertion either decreases the maximum rate at which information can be read out of the apparatus or involves the provision of considerable extra apparatus for storing and handling the signals read out.

According to the present invention there is provided data storage apparatus comprising a matrix of storage elements arranged to form matrix rows and columns, each storage element having two stable states between which it can be switched to represent either binary "one" or binary "zero," and a distributor for applying a read-out signal to each column of the matrix in turn in a predetermined order to cause all the storage elements in the column to be brought to the same given one of their two states by switching all those previously in the other state and also to cause a signal representing the state of each element in the column immediately prior to the application of the read-out signal to appear on a respective one of a set of output lines associated one with each element of the column, said distributor being arranged to apply a write signal to each column of the matrix in turn in said predetermined order simultaneously with the application of a read-out signal to the next succeeeding column in said predetermined order, the apparatus further including means for applying input signals to be stored in a given column of the matrix in binary form to the storage elements of that column over respective ones of a set of input lines associated one with each element of the column, the signals being applied simultaneously with the application of a write signal to the same column and a storage element being switched from said given one of its states to the other only on application to it simultaneously of a write signal and an input signal corresponding to the other state.

The matrix may be effectively divided into a first part and a second part constituted respectively by the two sets of columns formed by selecting alternate ones from said predetermined order of the columns and all the storage elements of each part row of the matrix are associated with a single part row output line and a single part row input line. In such a case, to provide for re-insertion, there may be provided first and second temporary stores, each comprising a single column of storage elements having two stable states between which they can be switched, and each column having the same number of storage elements as there are rows in the matrix, whilst the part row output lines of the first part of the matrix are each coupled to a corresponding one of the storage elements in the first temporary store so that signals read out from any column of the first part of the matrix can be registered in the first temporary store, the part row output lines of the second part of the matrix are similarly coupled to the storage elements of the second temporary store, the part row input line associated with each part row of the first part of the matrix is coupled to the same storage element of the first temporary store as is the part row output line associated with that part row, to receive signals read out from that storage element, the part row input line associated with each part row of the second part of the matrix is similarly coupled to the appropriate storage element of the second temporary store, and there are provided means for applying read-out signals to all the elements af each temporary store in turn, so that signals registered in the first temporary store are read out on each occasion of applying a write signal to a column of the first part of the matrix and signals in the second temporary store are read out on each occasion of applying a write signal to a column of the second part of the matrix.

In operation, where the matrix is divided into two parts, data is read out of the storage apparatus column by column, signals read out from a column in one part (this will be half if there is an even number of columns) of the matrix being fed in turn to the temporary store associated with that part of the matrix. Then as signals are read out from the next column of the matrix, this being in the other part it will be to the other temporary store, the signals stored in the one temporary store are fed back to the matrix column they were derived from. This process continues in operation, as long as it is not required to change the data stored in the matrix, the two temporary stores being used alternately to store the signals read out from a column until it is re-inserted in the same column at the same time as information stored in the succeeding column is being read out.

Whilst storage apparatus according to the present invention may include any suitable form of storage element, ferromagnetic or ferroelectric storage elements are thought to be particularly suitable.

Further, the present invention also provides electric computing or calculating apparatus including storage apparatus according to the present invention.

In addition whilst reference is made throughout this specification to matrix rows and columns, it will be appreciated that these terms apply to the electrical arrangement of the storage elements and not necessarily to their physical arrangement, although it may apply to the latter particularly in the case of magnetic cores. It will also be appreciated that the functions of the rows and columns of a matrix can be interchanged so that the rows take over the functions of columns and vice-versa. Such cases are to be understood to fall within the scope of the wording used in this specification.

Data storage apparatus according to the present invention will now be described by way of example with reference to the accompanying drawing in which.

The data storage apparatus to be described is a buffer store of an electronic digital computer. It handles data in the form of binary signals, in which the presence of a pulse at a predetermined time position represents binary "one" and the absence binary "zero." The data is stored in the form of "words" which are a set number of digits long, zeros being used to fill in where necessary, and the storage apparatus is designed to hold a predetermined number of words of the requisite length. The storage apparatus is designed for parallel operation, i.e. all the digits of a word being read into the store are presented simultaneously on an appropriate number of separate input lines, whilst on reading out a word the digits appear simultaneously on an appropriate number of output lines.

Figure 1:
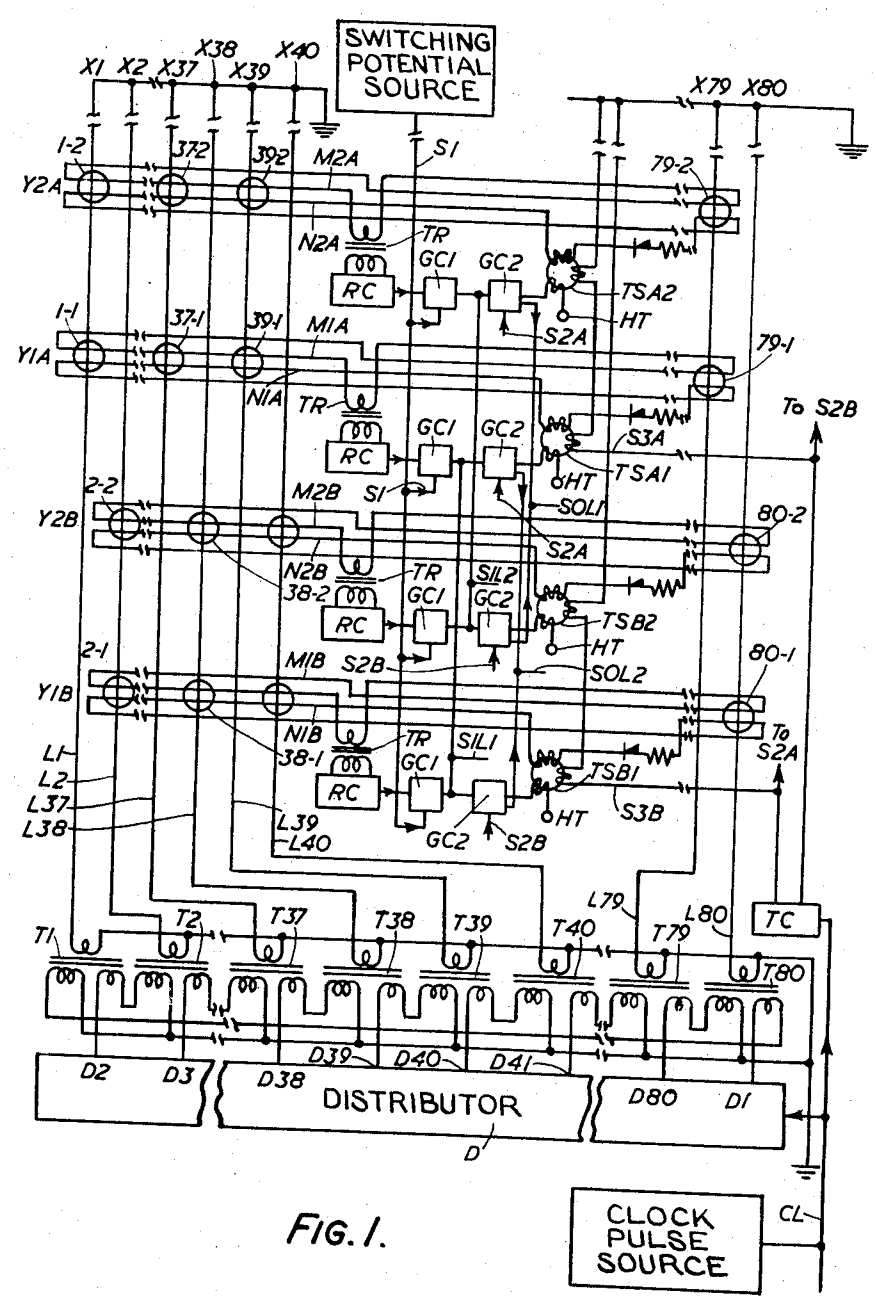
FIGURE 1 shows a circuit diagram of one embodiment of the present invention.

Referring now to FIGURE 1 of the drawing, it will be seen that the storage apparatus includes a matrix of annular ferromagnetic cores 1–1, 1–2 . . . etc. all of equal size and of a material having a substantially rectangular hysteresis characteristic. The matrix has eighty columns X1 to X80, of which only eight are shown, namely columns X1, X2, X37, X38, X39, X40, X79 and X80. It also has twenty rows Y1 to Y20 of which only the first two Y1 and Y2 are shown. The cores are referenced according to the particular row/column intersection at which they are situated. Thus the core 1–1 is at the intersection of column X1 and row Y1, whilst core 79–2 is at the intersection of column X79 and row Y2. The matrix is in fact divided effectively into two parts one containing the odd numbered columns and the other the even numbered ones. Each of the rows is accordingly divided into two part rows, given A and B sub-references respectively, so that row Y1 for example is divided into part rows Y1A and Y1B in the first and second parts of the matrix respectively. Each column X1–X80 is used to store a word in operation so that the total capacity is eighty words of twenty digits each. This can of course be varied as required in individual cases.

Each of the core columns X1 to X80 is threaded by a single wire winding L1 to L80 respectively, whilst the part rows Y1A to Y20A and Y1B to Y20B are each threaded by two wire windings, those for part row Y1A being M1A and N1A and the remainder being correspondingly numbered. Wherever necessary in FIGURE 1, breaks have been made in the leads to indicate where other rows and columns, leads or items of apparatus have been omitted, those omitted being in all cases duplicates of corresponding elements appearing in FIGURE 1.

Referring now to core 1–1, all other cores operating similarly, the column winding L1 is used for applying both read out and write signals, part row winding M1A is a sense winding and part row winding N1A is an input signal winding. The two conditions of the cores will be referred to as "set" representing binary one and "reset" representing zero. For setting the cores, the well-known half-current technique is employed, this in the case of core 1 involving the simultaneous passage of suitably directed currents through windings L1 and N1A, each current being slightly more than half the current necessary by itself to set the core 1–1, so that together they can cause the core 1–1 to be set. To read out from the core 1–1, a current in the other direction and of sufficient magnitude to reset the core 1–1 is caused to flow in the winding L1. On applying this read out signal to the winding L1, an output signal is produced in the sense winding M1A, provided the core 1–1 was "set" beforehand and not "reset."

Thus to write one on any core it is necessary to set it by applying a write signal half-current to the appropriate column winding simultaneously with an input signal half-current on the appropriate part row input winding. On application of a read-out signal to any column winding, say L1, all the cores 1–1 to 1–20 in that column which were previously set, will be reset producing output signals on the appropriate ones of the part row sense windings M1A to M20A.

Read-out and write signals are applied to the column windings L1–L80 from a scan distributor D which is fed with regularly recurrent clock pulses over the lead CL. The distributor D produces output pulses on each of eighty output terminals D1–D80 in order, the output pulses coinciding with successive ones of the input clock pulses. The distributor D may take any one of the many known forms but for operation at a high repetition frequency the magnetic core switching circuit shown and described with reference to FIGURE 2 of U.S. patent specification No. 2,719,961 is preferred. Associated with the distributor D are eighty transformers T1–T80, the secondary windings of which are each connected between the corresponding ones of the column windings L1–L80 and earth. Each transformer has two primary windings, marked "*a*" and "*b*" in FIGURE 1 and referred to as the read and write windings respectively. The read windings have a greater number of turns than the write windings, and the write winding of each transformer T1–T80 is connected in series with the read winding of the next in order between one of the output terminals D1–D80 of the distributor D and earth. As a result of this mode of connection, an output pulse on terminal D1 results in the energisation of the write winding of transformer T80 and the read winding of transformer T1. The next output pulse from the distributor D, i.e. that from terminal D2, will result in the energisation of the write winding of transformer T1 and the read winding of transformer T2 and so on for each of the terminals D3–D80 in turn. The turns ratio of the read and write windings is such that a distributor output pulse flowing through a read and a write winding in series will cause the appropriate "full" current to flow in the column winding coupled to the read winding and the appropriate "half" current to flow in the column winding coupled to the write winding. For example, a pulse at the terminal D2 will cause a read signal to be applied to the column winding L2 and a write signal to be applied simultaneously to the column winding L1.

Each of the part rows Y1A to Y20A and Y1B to Y20B has some items of apparatus associated with it, the combination being identical in each case apart from some variation in the external connections. Thus, referring only to part row Y1A for the moment, the sense winding M1A is connected to the primary winding of a transformer TR, the secondary winding of which is coupled to the input of a conventional full wave rectifier circuit RC arranged to produce a unidirectional pulse output in response to each read-out signal it receives from the winding M1A. The output of the rectifier circuit RC is coupled to the input of a first gate circuit GC1. This circuit GC1 is of conventional form and is such that it can be controlled by switching potentials applied to it over the line S1 which is also connected to the gate circuits GC1 associated with all the other part rows, to determine whether or not signals applied to its input appear at its output.

The output of gate circuit GC1 is connected together with a single input lead SIL1 which is associated with the first row Y1 of the matrix and is therefore also connected to the output of the gate circuit GC1 associated with part row Y1B, to the input of a second gate circuit GC2 which is similar to the gate circuit GC1. Similar lines SIL2–SIL20 are connected to the same points in the apparatus associated with the rows Y2–Y20 respectively. Switching potentials to control the passage of signals through gate circuit GC2 are applied to it over a line S2A which is connected to all those gate circuits GC2 associated with the part rows Y1A to Y20A, a similar line S2B being connected to the gate circuits GC2 associated with the part rows Y1B–Y20B.

The gate circuits GC2 differ slightly from the gate circuits GC1 but are again of conventional form. Each has an output connected to a signal output line, one of the series SOL1–SOL20 which are connected respectively to the outputs of the two gate circuits GC2 associated with each of rows Y1–Y20. At the same time, each has one stage which includes as a load, for example the anode load of the thermionic valve, a coil wound on the corresponding one of two series of annular ferromagnetic cores TSA1–20 and TSB1–20, one end of the coil being shown in FIGURE 1 connected to the appropriate gate circuit GC2 and the other to a terminal H.T. which is connected to a suitable high tension voltage line. The arrangement is such that the passage of a signal through a gate circuit GC2 results in a current flowing in the coil wound on the corresponding one of the cores TSA1–20 and TSB1–20, the current being sufficient to switch the core from its reset to its set condition.

The cores TSA1–20 form a first temporary store associated with the part rows Y1A–Y20A whilst the cores TSB1–20 form a second temporary store associated with the part rows Y1B–Y20B. Each core has two windings beyond that already mentioned. The first is a sense winding which is connected in series with a diode rectifier and a resistor across the corresponding one of the part row write windings N1A–N20A or N1B–N20B and the second is a read-out winding, those of the first temporary store being connected in series between a switching line S3A and earth and those of the second temporary store between a switching line S3B and earth. The lines S3A and S3B are connected to the two outputs of a bi-stable trigger circuit TC of conventional form which is supplied with clock pulses over the line CL and switches alternately between its two states on receipt of a pulse. In addition, as indicated by the arrows in FIGURE 1, the lines S3A and S3B are connected to all the switching lines S2B and S2A respectively controlling the gate circuits GC2.

Operation of this storage apparatus shown in FIGURE 1, assuming that it already contains data stored in it with the result that certain ones of the cores 1–1 to 80–20 are set and the remainder reset, will now be described. The distributor D operates continuously and cyclically producing output pulses on each of the terminals D1–D80 in turn. Considering the appearance of a pulse at the terminal D2, this will cause a read-out signal to be applied to column winding L2 and a write signal to winding L1 by virtue of energisation of the "*b*" winding of transformer T1 and the "*a*" winding of transformer T2. Ignoring the write signal for the moment, the read-out signal on winding L2 will cause any of the cores 2–1 to 2–20 in column X2 which are set to be reset, producing a signal in the appropriate ones of the part row sense windings M1B–M20B. These signals are applied to the inputs of the rectifier circuits RC through the transformer TR and thence to the inputs of the gate circuits GC1. For the moment the line S1 will be assumed to be at a potential such that the gate circuits GC1 can pass signals, so that the output signals are passed to the inputs of the second gate circuits GC2.

The trigger circuit TC is phased so that the lines S2A are at a high potential, thus opening those of the gate circuits GC2 to which they are connected, when read-out signals are applied to odd numbered ones of the column windings L1–L80, whilst the lines S2B are at a high potential when read-out pulses are applied to the even numbered ones of the column windings L1–L80. Therefore during the application of a read-out signal to the winding L2, the lines S2B will be at a high potential and the gate circuits GC2 coupled to the part row sense windings M1B–M20B will be open. Such of the latter windings as carry signals will therefore cause a signal to appear on the corresponding ones of the output lines SOL1–SOL20 and also will cause corresponding ones of the cores TSB1–20 of the second temporary store to be set (these cores are normally in the reset condition) by passage of current through the coils connected to the gate circuits GC2.

As a result the data that was stored in column X2 is now stored in the second temporary store, a signal in parallel form corresponding to the data stored on column X2 will have appeared on the output lines SOL1–20, and the cores of column X2 are all switched to the reset condition.

When the next distributor pulse appears, this time on terminal D3, column X3 will be read out in the same manner, signals caused by resetting of any cores in that column appearing on appropriate ones of the part row sense windings M1A–M20A and passing through the appropriate ones of the gate circuits GC1 and GC2 (the lines S2A are now at a high potential instead of the lines S2B) to be stored on the corresponding ones of the cores TSA1–20 of the first temporary store. At the same time, a signal corresponding to the data stored in column X3 will appear on the output lines SOL1–20.

At the same time as the read-out signal is applied to the winding L3 however, a half-current write signal is applied to the winding L2. In addition, the line S3B is at a high potential and causes a current to flow in the read-out windings of the cores TSB1–20 of the second temporary store. This resets any of the cores TSB1–20 which are set and causes a signal to appear in their sense windings. These are sufficient to cause half-currents to flow in the corresponding ones of the part row windings N1B–N20B. The latter currents will be coincident with a write signal in column winding X2 and will thus cause some of the cores 2–1 to 2–20 to be set, the particular ones being those that were set before the read-out signal was applied to the column X2. At the same time as the data stored in the column X3 has been read out and stored in the first temporary store therefor, the data originally stored in the column X2 has been re-inserted into that column. Similarly when the column X2 was read out, the half-current write signal applied to column X1 gave rise to the re-insertion into column X1 of the signals that had previously been read-out into the first temporary store. This process will continue cyclically through all the columns X1–X80 of the matrix under the control of the distributor D, as long as clock pulses appear on the line CL.

If for any reason it is required to read new data into the store, the potential on the switching line S1 is changed to block the gate circuits GC1 for the period during which the particular matrix column for which the new data is intended, is read out. At the same time the new data as a binary signal in parallel form is applied to the input terminals SIL1–SIL20, passes through the gate circuits GC2 to one of the temporary stores, the particular one being determined by whichever one of the sets of lines S2A and S2B is at a high potential. The new signals will then be inserted in the desired matrix column when the next distributor pulse appears, being written into that column as it is read out from the temporary store into which it was initially fed. This process can be repeated with any or all of the columns X1–X80 as required, the necessary blocking potential being applied to the line S1 when the particular column is read out and the signals being applied at the same time to the input terminals SIL1–20.

As shown in FIGURE 1, each of the part row sense windings M1A–M20A and M1B–M20B is coupled to the cores of columns X1–X40 in the opposite sense to that in which it is coupled to the cores of columns X41–X80.

This changeover is symmetrical and is used to obviate pick-up from the corresponding one of the write windings N1A–N20A and N1B–N20B. As a result of this signals received from the various columns X1–X80 over a sense winding may be of opposite sense and it is therefore necessary for the rectifier circuits RC to be full wave rectifiers so as to produce an output of a given polarity regardless of the polarity of the input. In addition the rectifiers are included in series with the output windings of the cores TSA1–20 and TSB1–20 to prevent setting of those cores producing a signal in the write windings N1A–N20A and N1B–N20B to which they are coupled.

It will be appreciated that the numbers of rows and columns of the matrix may be varied at will to vary the number of data "words" which can be stored, or the number of digits in a word. Further it is not essential that the storage elements should be magnetic cores, other types of elements being equally capable of use in apparatus according to the invention. Whilst it is convenient to use magnetic cores in the temporary stores, particularly when the matrix contains magnetic cores, this again is by no means essential, and other forms of storage element may also be used there.

As described, the distributor D operates continuously giving a continuous column by column read-out from the matrix. If required, by controlling the advent of clock pulses on the line CL, for example by a suitable gate circuit, its operation can be altered, so that the distributor D executes one or a chosen number of cycles and is then quiescent for a predetermined period.

The distributor D may take any of the several well-known forms of apparatus for this purpose and may for example be a delay line distributor (with appropriate output shaping circuits), a ring counter circuit employing thermionic or cold cathode valves or transistors, a chain of trigger circuits arranged to form a shifting register, or a shifting register circuit employing ferromagnetic cores. A circuit of the latter type of distributor is shown and described with reference to FIGURE 2 of U.S. patent specification No. 2,719,961, this being a circuit which is particularly suitable for operation at high speeds, for example at a repetition frequency of 1 mc./s.

Figure 2:
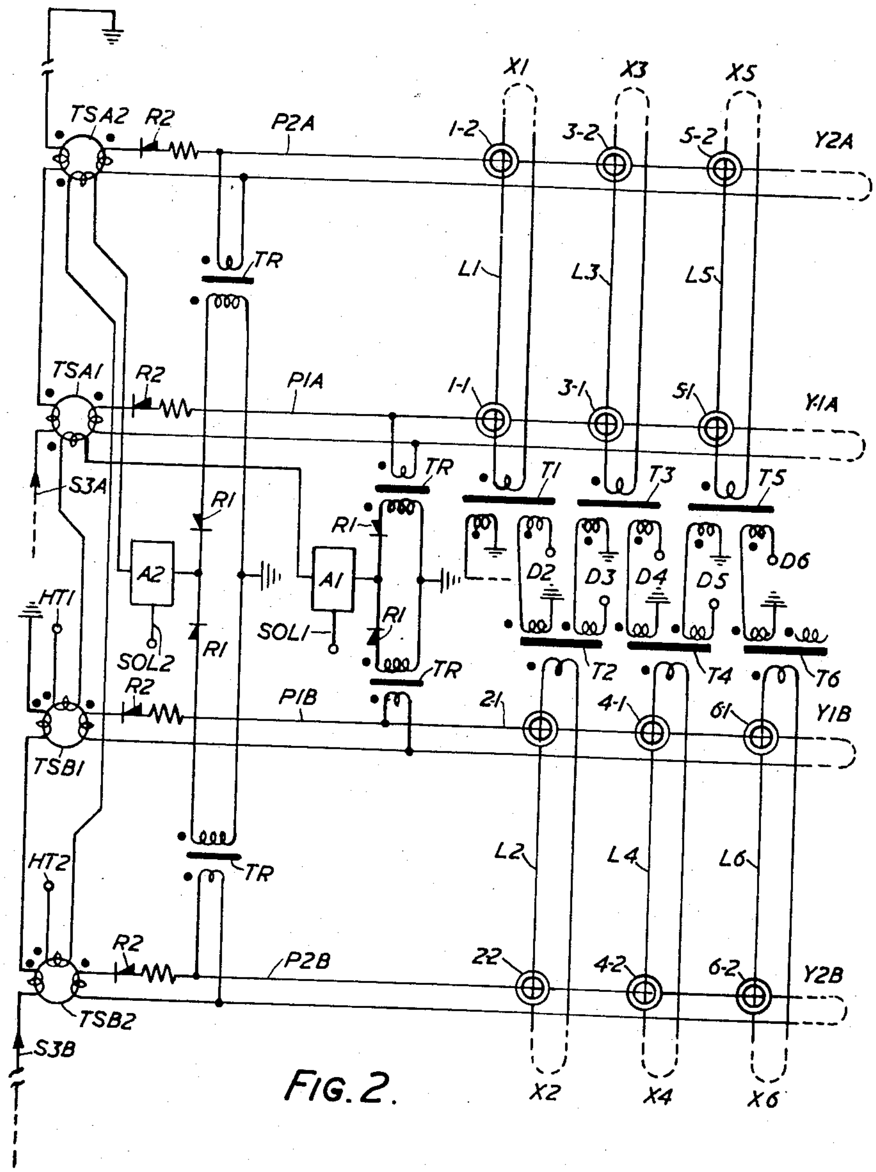
FIGURE 2 shows a circuit diagram of a modified version of the embodiment shown in FIGURE 1.

Whilst both the apparatus described with reference to FIGURE 1 and that to be described with reference to FIGURE 2, provide for the re-insertion of data read out from any column of the matrix, this is not an essential feature of apparatus according to the present invention, and the apparatus may simply be arranged to provide for reading out signals from one column at the same time as they are being written into preceding column of the matrix, the distributor providing the necessary energisation of the column windings two at a time, one with a read-out signal and the other with a half-current write signal.

FIGURE 2 shows in simplified form a part of the circuit of a modified version of the storage apparatus described with reference to FIGURE 1. The matrix is assumed to be the same size as that shown in FIGURE 1 but only rows Y1 and Y2 of columns X1–X6 are shown, the same references being used as in FIGURE 1 where applicable. In the temporary stores, only cores TSA1–2 and TSB1–2 are shown, although each has twenty cores as before, whilst for simplicity the distributor D itself has been omitted from FIGURE 2, only some of its terminals D1–D80 being shown.

The main difference from the apparatus shown in FIGURE 1, is that each part row has a combined write and sense winding P1A–P20A or P1B–P20B respectively. The column windings L1–L80 are arranged as before, each one being connected to the secondary winding of the corresponding one of the transformers T1–T80 which each, as in FIGURE 1, have two primary windings connected in the manner described previously to the terminals D1–D80 of the distributor D so that each winding L1–L20 receives a read-out signal in turn followed by a half-current write signal simultaneous with the application of a read-out signal to the next in order.

The connection of the part row windings P1A–P20A and P1B–P20B is similar in each case. Referring to winding P1A only therefore, it is connected across the primary of a transformer TR, the secondary of which is coupled by a rectifier to the input of an amplifier A1 common to itself and the other part row winding P1B constituting the row Y1. The output of the amplifier A1 is connected to the signal output line SOL1, whilst the write coils of the first cores TSA1 and TSB1 of the first and second temporary stores are connected in series between a high tension voltage supply source connected to a terminal HT1 and the amplifier A1 the arrangement being such that a switching current tending to reset the cores TSA1 and TSB1 flows through them whenever a signal pulse is received from either of the windings P1A and P1B.

The read-out windings of the cores TSA1–20 are connected in series between the line S3B and earthwhilst those of the cores TSB1–20 are connected in series between the line S3A and earth. The trigger circuit TC of FIGURE 1 is again provided but is not shown in FIGURE 2, and operates as before to raise the potentials of the lines S3A and S3B alternately, the former when the even numbered columns have a read-out signal applied to them and the latter when the odd numbered columns have a read-out signal applied to them.

The output coil of the core TSA1 is connected in series with a rectifier R2 and a resistor across the corresponding part row winding P1A. The value of the resistor in each case is in known manner made small compared with the impedance of the output coil for example so that its combined impedance with the winding P1A is one-twentieth of the impedance of the coil. This has the effect that when the core is switched from the reset to the set condition, the proportion of the input current absorbed by the core is small and the magnitude of the output current is fixed mainly by the input current and the turns ratio of the drive coil and the output coil. If the core is reset, the rectifier R2 prevents current flowing through the winding P1A and the current required for resetting is comparatively small. If therefore small resetting currents are used, simultaneous applications of setting and resetting currents to different coils of the same core will result in setting with only a slight reduction in the output current flowing.

Operation is as follows, assuming the matrix to have data already stored in it. When a pulse appears at the terminal D2, any of the cores 2–1 to 2–20 in column X2 already set are reset and give rise to signals in the corresponding ones of the part row windings P1B–P20B. These pass through the transformers TR to the inputs of the corresponding ones of the amplifiers A1–A20 and thence appear as an output signal in parallel form on the output lines SOL1–SOL20. They also cause reset currents to flow in the corresponding cores of both the temporary stores. At the same time as the read-out signal is applied to the column winding L2 however, a setting current flows from the line S3A through the read-out windings of cores TSA1–20 of the first temporary store. As explained above, the resetting currents are made small compared with the setting currents, and as a result therefore any of the cores TSA1–20 which were reset, are set despite the resetting current flowing at the same time and cause half-write currents to flow in the corresponding ones of part row windings P1A–P20A. At the same time such of the cores TSB1–20 which receive reset currents are reset, since no setting currents are flowing in their coils. Some of the cores TSA1–20 will have been reset previously in accordance with the signals read out previously from the column X1 (as opposed to FIGURE 1 the temporary store cores are reset to indicate one) so that the half-write currents generated by their setting will correspond to the data that had been stored in column X1 prior to reading out. Since a half-current write signal is applied to the column X1 winding L1 at the same time as a read-out signal is applied to the winding L2, the appropriate ones of the cores 1–1 to 1–20 will be set and the data read out from it will have been re-inserted. Thus, as before, a pulse on the terminal D2 causes read-out of the column X2 to the output lines SOL1–20 and also to the second temporary store. At the same time, the data stored in the first temporary store is read out and stored in the column X1 from which it had previously been read-out.

Going on the next pulse which is on the terminal D3, the data from the column X3 is read out, giving signals on the output lines SOL1–SOL20 again, and stored in the first temporary store, resetting of the cores TSB1–20 of the second temporary store being inhibited by the setting current flowing through their read-out windings from the line S3B. This same current causes half-write currents to flow in those of the part row windings P1B–P20B which are coupled to the cores which had been reset when column X2 was read out as described above. These half-write currents coincide with the application of a half-current write signal to the winding L2 and the data read out from the column X2 is re-inserted into it.

The circuit shown in FIGURE 2 does not include facilities for introducing fresh data into the store, but it will be appreciated that this can be accomplished readily, as in FIGURE 1, by inserting a gate circuit in the inputs to the amplifiers A1–A20, and providing signal input lines SIL1–20 coupled to the connections between the gate circuits and the amplifiers. As with the apparatus of FIGURE 1, the gate circuits would be closed when the column for which fresh data is intended, is read out, the new data being supplied simultaneously to the lines SIL1–20 as a binary signal in parallel form.

I claim:

1. Data storage apparatus comprising a matrix of storage elements arranged to form matrix rows and columns, each storage element having two stable states between which it can be switched to represent binary "one" or binary "zero," the columns of the matrix being divided into two sets formed respectively by selecting alternate ones from a predetermined order of the columns and the matrix rows consequently being divided into two corresponding sets of part rows, a pulse distributor having a plurality of output terminals equal in number to the columns of the matrix and producing output pulses at each of said output terminals in turn, a plurality of column lines associated one with each matrix column, a first coupling means for each column line coupling it to a respective one of said output terminals and responding to the production of an output pulse at the respective output terminal to generate a read-out signal on the column line of magnitude such that it is alone effective to switch simultaneously all of those storage elements of the column that were in the first one of said two stable states to the second one, the order of coupling the column lines to the output terminals being arranged so that read-out signals are generated in the column lines in said predetermined order, a second coupling means for each column line coupling it to the same output terminal as the next succeeding one of the column lines in said predetermined order and responding to the production of an output pulse at the output terminal concerned to generate a write signal on the column line insufficient by itself to cause switching of the elements of the column, two sets of signal output lines, one set for each set of part rows and each one of a set being associated with all the storage elements of a respective one of the part rows of the corresponding set to produce an output signal on switching of any one of the elements of the part row from the first state to the second state, two sets of signal input lines, one set for each set of part rows and each one of a set being associated with all the storage elements of a respective one of the part rows of the corresponding set, means for applying input signals in binary form for storage in a given column of the matrix to the set of signal input lines which is associated with the storage elements of the set of columns to which the given column belongs, only those storage elements of a column being simultaneously switched from the second state to the first state by the coincidence on the column line and the signal input lines intersecting at the elements concerned of a write signal and an input signal of the kind represented by the first state of a storage element.

2. Data storage apparatus as claimed in claim 1 and further comprising a first and a second temporary store each having the same number of storage elements as a single column of the matrix, means coupling the first temporary store to one of said sets of signal output lines, a single temporary storage element being coupled to each line of the set, to register signals appearing on said set of lines, means likewise coupling the second temporary store to the other of said sets of signal output lines, means for applying a reading signal to either temporary store to restore it to a datum condition and generate a set of sense output signals representing its condition before reading, means for separately applying the sense output signals of each temporary store to the one of said sets of signal input lines that is associated with the same set of part rows as the set of signal output lines coupled to the temporary store concerned, and means for controlling the application of reading signals to the temporary stores so that a reading signal is applied to each in synchronism with the application of a write signal to any one of the corresponding set of matrix columns.

3. Data storage apparatus as claimed in claim 2 in which said means coupling each element of a temporary store to a signal output line, each include a first gate circuit having two conditions of operation "open" and "closed" and means for applying a control potential simultaneously to all said first gate circuits to determine their condition, and said means for applying input signals to a set of signal input lines includes means for feeding said signals to be registered in the temporary store coupled to the set of signal input lines, said control potential application means and said input signal application means being synchronised to the pulse distributor to operate to close the first gate circuits and to apply the signals required to be stored in a given column of the matrix at the same time as a read-out signal is applied to that column.

4. Data storage apparatus as claimed in claim 3 in which the means coupling each element of a temporary store to a signal output line each includes a second gate circuit coupled between the output of the first gate and the respective storage element of the temporary store, said input signal application means includes means for feeding input signals for a given row of the matrix to the inputs of both second gates associated with that row, there being provided means for controlling the two second gates so that the one associated with the first set of the matrix columns is open only when a read-out signal is applied to a column of the first set and the one associated with the second set of the matrix columns is open only when a read-out signal is applied to a column of the second set.

5. Data storage apparatus comprising a matrix of annular magnetic storage cores of a ferromagnetic material having a substantially rectangular hysteresis characteristic, the two states of magnetic saturation in opposite directions around a core representing respectively binary "one" and binary "zero," the matrix comprising a plurality of rows and columns and being sub-divided into a first part and a second part formed respectively by selecting alternate ones of the matrix columns from a predetermined order thereof, the matrix rows consequently being divided into two corresponding sets of part rows, a read-out signal winding for each column coupled to all the cores thereof, a write signal winding for each column coupled to all the cores thereof, a pulse distributor having a plurality of output terminals equal in number to the number of columns and producing output pulses at each of said output terminals in turn, means coupling each read-out signal winding to a respective one of said output terminals in order and responding to the production of an output pulse at that terminal to generate a read-out signal in the winding to switch simultaneously all those cores of the column previously in the first of said two states to the second one, the order of coupling being determined so that read-out signals are generated in the read-out windings in the said predetermined order of the columns, means coupling each write signal winding to the same one of said output terminals as the read-out signal winding of the succeeding column of said predetermined order, a first and a second set of signal output windings for the first and second parts of the matrix respectively, one winding for each part row and coupled to all the cores in that part row to generate an output signal if any core changes from the first to the second state, a first and a second set of signal input windings for the first and second parts of the matrix respectively, one winding for each part row and coupled to all the cores in that part row, a first and a second temporary store, means coupling the first and second sets of signal output windings to the first and second temporary stores respectively to apply any output signals generated in said windings to be stored in the corresponding store, means for applying reading signals to the temporary stores alternately and coincidentally with the application of a write signal to a column of the corresponding part of the matrix, each reading signal restoring the temporary store to a datum condition and causing the generation of signals representing the previous state of the store, and means for coupling the first and second sets of signal input windings to the first and second temporary stores respectively to receive said generated signals, the order of coupling being such that a signal is applied to the input winding of each row from which a signal was received by the store, the magnitudes of the write signals applied to the column windings and the signals applied to the signal input windings being determined so that only on coincidence of such sigals at a given core is that core switched from its second state to the first state.

6. Data storage apparatus according to claim 5 in which each temporary store comprises a single column of annular magnetic storage cores of a ferromagnetic material having a substantially rectangular hysteresis characteristic, the number of cores equalling the number of rows on the matrix and each core having a first and a second state of magnetic saturation in opposite directions around the core.

7. Data storage apparatus according to claim 6 in which each core of a temporary store has three windings, a first winding coupled to a corresponding one of the set of signal output lines coupled to that store and arranged to switch the core from the first to the second state on receipt of a signal from the output line, a second winding coupled to the corresponding one of the set of signal input lines coupled to that store and a third winding common to all the other cores of the same store and coupled to a source of read-out signals for switching any core from its second state to its first state, means being provided in the coupling of the second winding to suppress any signals generated in it by switching of the core from its first state to its second one.

8. Data storage apparatus according to claim 5 in which the column read-out signal windings and write signal windings are each combined in a single winding for each column.

9. Data storage apparatus according to claim 8 in which the means coupling the column windings to the pulse distributor comprise a set of transformers one for each column of the matrix, each transformer having one secondary winding and first and second primary windings, the second primary winding of each transformer being coupled to the same output terminal of the distributor as the first primary winding of the next transformer for the next succeeding one of said predetermined order of the columns.

10. Data storage apparatus according to claim 9 in which each second primary winding is connected in series with the appropriate first primary winding across the output terminal of the distributor, the second primary windings having in each case between half and three-quarters the number of turns of the first primary winding.

References Cited in the file of this patent

UNITED STATES PATENTS

| | | |
|---|---|---|
| 2,719,965 | Person | Oct. 4, 1955 |
| 2,802,203 | Stuart-Williams | Aug. 6, 1957 |
| 2,910,674 | Wittenberg | Oct. 27, 1959 |
| 2,918,655 | Pulvari | Dec. 22, 1959 |
| 2,922,145 | Bobeck | Jan. 19, 1960 |